(12) United States Patent
Kim et al.

(10) Patent No.: US 10,923,766 B2
(45) Date of Patent: Feb. 16, 2021

(54) HYBRID SOLID ELECTROLYTE FOR SECONDARY BATTERY AND MANUFACTURING METHOD THEREOF

(71) Applicant: SEVEN KING ENERGY CO., LTD., Seongnam-si (KR)

(72) Inventors: Jae-Kwang Kim, Changwon-si (KR); Ji-Won Son, Changwon-si (KR); Seoung Soo Lee, Changwon-si (KR); Young Jun Lim, Ulsan-si (KR); Hyun Woo Kim, Ulsan-si (KR); Yeon-Gil Jung, Changwon-si (KR); Youngsik Kim, Ulsan-si (KR); Jing Lee, Changwon-si (KR)

(73) Assignee: SEVEN KING ENERGY CO., LTD., Seongnam-si (KR)

( * ) Notice: Subject to any disclaimer, the term of this patent is extended or adjusted under 35 U.S.C. 154(b) by 0 days.

(21) Appl. No.: 16/358,909

(22) Filed: Mar. 20, 2019

(65) Prior Publication Data
US 2019/0260077 A1  Aug. 22, 2019

Related U.S. Application Data

(63) Continuation-in-part of application No. PCT/KR2016/011180, filed on Oct. 6, 2016.

(30) Foreign Application Priority Data

Sep. 21, 2016  (KR) .................. 10-2016-0120694

(51) Int. Cl.
*H01M 10/0525* (2010.01)
*H01M 10/0565* (2010.01)
(Continued)

(52) U.S. Cl.
CPC ..... *H01M 10/0565* (2013.01); *H01M 10/052* (2013.01); *H01M 10/054* (2013.01); *H01M 10/056* (2013.01); *H01M 10/058* (2013.01); *H01M 10/0525* (2013.01); *H01M 10/0562* (2013.01); *H01M 10/0566* (2013.01); *H01M 10/0569* (2013.01); *H01M 2300/0037* (2013.01)

(58) Field of Classification Search
CPC ......... H01M 10/0525; H01M 10/0565; H01M 10/0569; H01M 10/058; H01M 2300/0025; H01M 2300/0065; H01M 2300/0082; H01M 2300/0085; H01M 2300/0088
See application file for complete search history.

(56) References Cited

FOREIGN PATENT DOCUMENTS

| JP | 2008-277170 A | 11/2008 |
|----|---------------|---------|
| JP | 2012-186055 A | 9/2012  |

(Continued)

OTHER PUBLICATIONS

English translation of JP Publication 2014-212103, Nov. 2014.*
(Continued)

*Primary Examiner* — Brittany L Raymond

(57) ABSTRACT

Provided is a hybrid solid electrolyte comprising: a hybrid film including (i) 60 to 100 parts by weight of an ion conductive ceramic and (ii) 1 to 40 parts by weight of a polymer; and a liquid electrolyte including (i) an ion compound selected from the group consisting of lithium ions and sodium ions and (ii) a solvent, wherein the hybrid film is impregnated with the liquid electrolyte.

4 Claims, 5 Drawing Sheets

(51) Int. Cl.
   *H01M 10/0569* (2010.01)
   *H01M 10/058* (2010.01)
   *H01M 10/052* (2010.01)
   *H01M 10/054* (2010.01)
   *H01M 10/056* (2010.01)
   *H01M 10/0566* (2010.01)
   *H01M 10/0562* (2010.01)

(56) References Cited

FOREIGN PATENT DOCUMENTS

| | | | |
|---|---|---|---|
| JP | 2014-212103 | * | 11/2014 |
| JP | 2014-212103 A | | 11/2014 |
| JP | 2016-018606 A | | 2/2016 |
| KR | 10-2003-0007659 A | | 1/2003 |
| KR | 10-2006-0021222 A | | 3/2006 |
| KR | 10-2012-0092918 A | | 8/2012 |
| KR | 10-2013-0142224 A | | 12/2013 |
| KR | 10-2015-0037397 | * | 4/2015 |
| KR | 10-2015-0037397 A | | 4/2015 |
| KR | 10-2015-0041217 | * | 4/2015 |
| KR | 10-2015-0041217 A | | 4/2015 |
| KR | 10-2015-0119885 A | | 10/2015 |
| KR | 10-2016-0026648 A | | 3/2016 |
| KR | 10-2016-0108932 A | | 9/2016 |
| KR | 10-2017-0076246 A | | 7/2017 |

OTHER PUBLICATIONS

"Electrochemical Properties of a Ceramic-polymer-composite-solid Electrolyte for Li-Ion Batteries", Solid State Ionics, vol. 284, 2016, pp. 20-24. Dec. 10, 2015, Seoung Soo Lee et al.

"Effect of sol-gel process parameters on the properties of a Li1.3Ti1.7Al0.3(PO4)3 solid electrolyte for Li-ion batteries" Journal of the Korean Physical Society, vol. 68, No. 1, Jan. 2016, pp. 28-34. Feb. 3, 2016, Seoung Soo Lee et al.

International Search Report for PCT/KR2016/011180 dated May 4, 2017.

Written Opinion from International Search Authority for PCT/KR2016/011180 dated May 4, 2017.

* cited by examiner

HYBRID SOLID ELECTROLYTE FOR SECONDARY BATTERY AND MANUFACTURING METHOD THEREOF

TECHNICAL FIELD

The present invention relates to a hybrid solid electrolyte for a secondary battery, having improved stability and electrochemical characteristics, and a manufacturing method thereof.

BACKGROUND ART

Recently, substantive attention is given to large capacity batteries for use in automobiles and fixed batteries. There is more demand for large capacity batteries applicable to fixed storage batteries for electric automobiles than small batteries applicable to mobile devices. Next-generation secondary batteries are expected to have better stability and an extended life time.

A liquid electrolyte such as a lithium secondary battery has been widely used for a commercially secondary battery. However, the liquid electrolyte is not satisfactory in terms of stability due to its high inflammability and low thermal stability.

To improve stability of the lithium secondary battery, replacing the liquid electrolyte with a solid electrolyte was suggested. The solid electrolyte is a ceramic-based solid electrolyte. The solid electrolyte is advantageous in that it is light in weight, there is no concern of electrolyte leakage, and it has excellent variability. However, it is disadvantageous in that its ion conductivity at room temperature is low and its resistance at an interfacial with an electrode is high. Such property negatively affects battery performance.

SUMMARY OF INVENTION

To achieve the objective of the present invention, provided is a hybrid solid electrolyte comprising: a hybrid film including (i) 60 to 100 parts by weight of an ion conductive ceramic and (ii) 1 to 40 parts by weight of a polymer; and a liquid electrolyte including (i) an ion compound selected from the group consisting of lithium ions and sodium ions and (ii) a solvent, wherein the hybrid film is impregnated with the liquid electrolyte.

The hybrid solid electrolyte includes (i) 60 to 100 parts by weight of the hybrid film and (ii) 1 to 40 parts by weight of the liquid electrolyte.

The lithium ions are derived from a lithium salt. The sodium ions are derived from a sodium salt. The liquid electrolyte is a solution obtained by dissolving 0.1-3M of lithium salt or 0.1-3M of sodium salt in the solvent. The solvent includes an ionic liquid.

The hybrid solid electrolyte has a thickness of 10-150 μm. The hybrid solid electrolyte has a thermal stability at 400° C. or more.

Also provided is a secondary battery comprising the hybrid solid electrolyte according to the present invention.

Furthermore, provided is a method for producing a hybrid solid electrolyte, comprising: mixing 60 to 100 parts by weight of an ion conductive ceramic and 1 to 40 parts by weight of a polymer to prepare a mixture slurry; making the mixture slurry into a film shape to obtain a hybrid film; and interfusing a liquid electrolyte into the hybrid film to form a hybrid solid electrolyte.

The liquid electrolyte comprises an ionic liquid as a solvent. In the interfusing step, 60 to 100 parts by weight of the hybrid film is impregnated with 1 to 40 parts by weight of the liquid electrolyte.

DETAILED DESCRIPTION OF INVENTION

Hereinafter, the present invention will be described in more detail. A ceramic solid electrolyte has high ion conductivity and a high lithium (or sodium) ion transport rate. However, its electrochemical characteristics as a secondary battery are relatively inferior due to its high interfacial resistance. In contrast, a polymer solid electrolyte has good variability. However, it has low ion conductivity at room temperature, low electrochemical oxidation stability, and high resistance at an interfacial with electrodes.

Tenacious studies have been made by the inventors to find a composite polymer electrolyte which has electrochemical characteristics appropriate for a battery. To meet this condition, the composite polymer electrolyte needs to have high stability, high ion conductivity at room temperature, and low interfacial resistance with an electrode. Finally, the inventors invented a hybrid solid electrolyte and arrived at the present invention. The hybrid solid electrolyte according to the present invention has thermal stability at 400'C or more, an electrochemical oxidation stability at 6 V or more, and low interfacial resistance.

A hybrid solid electrolyte according to an embodiment of the present invention includes a hybrid film and a liquid electrolyte. The hybrid film includes (i) 60 to 100 parts by weight of an ion conductive ceramic and (ii) 1 to 40 parts by weight of a polymer. The liquid electrolyte includes (i) an ion compound selected from the group consisting of lithium ions and sodium ions and (ii) a solvent.

The hybrid film is impregnated with the liquid electrolyte. The liquid electrolyte is absorbed into the hybrid film.

The ion conductive ceramic may include $Al_2O_3$-based, $SiO_2$-based, $BaTiO_3$-based, $TiO_2$-based ion conductive ceramics. In another embodiment, the ion conductive ceramic may include a lithium oxide-based ion conductive ceramic such as $Li_{1.3}Al_{0.3}Ti_{1.7}(PO_4)_3$(LTAP), $Li_7La_3Zr_2O_{12}$ (LLZO), $Li_2La_3Ta_2O_{12}$, and $Li_9SiAlO_8$. In yet another embodiment, the ion conductive ceramic may include a lithium sulfide-based compound such as $Li_{10}GeP_2S_{12}$, $Li_2S-P_2S_5$, $Li_2S-Ga_2S_3-GeS_2$. In yet another embodiment, the ion conductive ceramic may include a sodium oxide-based compound such as $Na_3Zr_2Si_2PO_{12}$.

In yet another embodiment, the ion conductive ceramic can be selected from the group consisting of (i) an amorphous ion conductive material (e.g., phosphorus-based glass, oxide-based glass, oxide/sulfide based glass, etc.), (ii) a Na superionic conductor (e.g., NASICON), (iii) a sodium sulfide-based solid electrolyte, (iv) a sodium oxide-based solid electrolyte such as $Na_3Zr_2Si_2PO_{12}$, and (v) a combination thereof.

Preferably, the ion conductive ceramic may include: (i) a lithium oxide ceramic selected from the group consisting of $Li_{1.3}Al_{0.3}Ti_{1.7}(PO_4)_3$, $Li_7La_3Zr_2O_{12}$, $Li_2La_3Ta_2O_{12}$, $Li_9SiAlO_8$, and a combination thereof; (ii) a lithium sulfide ceramic selected from the group consisting of $Li_{10}GeP_2S_2$, $Li_2S-P_2S_5$, $Li_2S-Ga_2S_3-GeS_2$, and a combination thereof; (iii) a Na superionic conductor (NASICON); (iv) a sodium sulfide ceramic selected from the group consisting of $Na_2S-SiS_2$, $Na_2S-GeS_2$, and a combination thereof; (v) a sodium compound ceramic selected from the group consisting of $NaTi_2(PO_4)_3$, $NaFe(PO_4)$, $Na_2(SO_4)_3$, $Na_3Zr_2Si_2PO_{12}$, and a combination thereof; or (vi) a combination thereof.

$Li_{1.3}Al_{0.3}Ti_{1.7}(PO_4)_3$(LTAP) or $Na_3Zr_2Si_2PO_2$ is more preferable as the ion conductive ceramic. When $Li_{1.3}Al_{0.3}Ti_{1.7}(PO_4)_3$(LTAP) or $Na_3Zr_2Si_2PO_{12}$ is employed, it is easy to produce the hybrid solid electrolyte. In addition, the resultant hybrid solid electrolyte may have much improved ion conductivity.

The polymer may be selected from the group consisting of a polyvinylidene fluoride (PVdF)-based polymer, a poly [vinylidenefluoride-co-trifluoroethylene] (P(VDF-TrFE))-based polymer, a polyethylene glycol (PEO)-based polymer, a polyacrylonitrile (PAN)-based polymer, a poly(methyl methacrylate) [PMMA]-based polymer, a polyvinyl chloride-based polymer, a polyvinylpyrrolidone (PVP)-based polymer, a polyimide (PI)-based polymer, a polyethylene (PE)-based polymer, a polyurethane (PU)-based polymer, a polypropylene (PP)-based polymer, a poly(propylene oxide) [PPO]-based polymer, a poly(ethylene imine) [PEI]-based polymer, a poly(ethylene sulfide) [PES]-based polymer, a poly(vinyl acetate) [PVAc]-based polymer, a poly(ethylene succinate) [PESc]-based polymer, a polyester-based polymer, a polyamine-based polymer, a polysulfide-based polymer, a silicone-based polymer, siloxane-based polymer, and a combination thereof.

A polymer including PVdF is preferable. A hybrid solid electrolyte employing PVdF has better ion conductivity, thermal stability, and electrochemical stability compared with others. The PVdF is excellent in absorbing liquid electrolyte, thereby having the hybrid film hybrid film sufficiently impregnated with the liquid electrolyte.

A mixture ratio of the ion conductive ceramic:the polymer may be 60 to 100 parts by weight:1 to 40 parts by weight, preferably, 60 to 78 parts by weight:22 to 40 parts by weight, and more preferably 95 to 85 parts by weight:5 to 15 parts by weight.

When mixed at the above-mentioned ratio, the hybrid solid electrolyte shows excellent characteristics both in stability and in ion conductivity at room temperature. Under the mixture ratio condition, the ion conductive ceramic can be well dispersed into the hybrid film and a binding effect by the polymer is maximized. In addition, no leakage occurs. Thus, under the mixture ratio condition, the hybrid film can be sufficiently impregnated with the liquid electrolyte without a leakage.

The hybrid film is obtained as follows. First, the ion conductive ceramic and the polymer are mixed with each other. An appropriate solvent can be added to the mixture (or a mixture slurry), if necessary. For example, a mixture of N-methyl-2-pyrrolidone (NMP) and acetone, whose mixture ratio is 1:3 in volume ratio, may serve as the solvent, but the solvent is not limited thereto. Then, the mixture is shaped into the hybrid film.

The hybrid film, which includes an ion conductive ceramic and a polymer, alone may serve as a solid electrolyte in that it has excellent ion conductivity. However, for a better electrochemical performance as a battery, the hybrid film is impregnated with a liquid electrolyte so that the liquid electrolyte is absorbed into the hybrid film.

The liquid electrolyte includes (i) lithium ions or sodium ions and (ii) a solvent. The lithium ions and the sodium ions may be derived from a lithium salt and a sodium salt, respectively, but not limited thereto. That is, any sort of lithium ions and any sort of sodium ions may be employed so long as it can be applicable to a secondary battery.

The lithium salt may be selected from the group consisting of $LiClO_4$, $LiPF_6$, $LiBF_4$, $CF_3SO_2NLiSO_2CF_3$ (LiTFSI), $LiB(C_2O_4)_2$, $Li[N(SO_2F)_2]$ (LiFSI), $Li[B(C_2O_4)_2]$, $LiAsF_6$, and a combination thereof. The sodium salt may be selected from the group consisting of $NaClO_4$, $NaBF_4$, $NaPF_4$, $NaPF_6$, $NaAsF_6$, $CF_3SO_2NNaSO_2CF_3$ (NaTFSI), $NaB(C_2O_4)_2$, $Na[(C_2F_5)_3PF_3]$, $Na[B(C_2O_4)_2]$, $Na[N(SO_2F)_2]$ (NaFSI), $NaN[SO_2C_2F_5]_2$, and a combination thereof.

As the solvent, a non-aqueous organic solvent may be used. The non-aqueous organic solvent may be selected from the group consisting of a carbonate-based solvent, an ester-based solvent, an ether-based solvent, a phosphate-based solvent, a ketone-based solvent, an alcohol-based solvent, and a combination thereof. In another embodiment, an aprotic solvent may also be employed as the solvent.

In another embodiment, the solvent may be an ionic liquid. An ionic liquid is advantageous in that stability of an electrolyte, especially thermal stability, is further improved. Specifically, the ionic liquid may include an imidazolium-based ionic liquid, a pyridinium-based ionic liquid, a pyrrolidinium-based ionic liquid, an ammonium-based ionic liquid, a piperidinium-based ionic liquid, or a combination thereof.

More specifically, the ionic liquid may include (i) a cation selected from the group consisting of an imidazolium-based ionic liquid, a pyridinium-based ionic liquid, a pyrrolidinium-based ionic liquid, an ammonium-based ionic liquid, a piperidinium-based ionic liquid, and a combination thereof, and (ii) an anion selected from the group consisting of $BF_4^-$, $PF_6^-$, $AsF_6^-$, $SbF_6^-$, $AlCl_4^-$, $HSO_4^-$, $ClO_4^-$, $Cl^-$, $Br^-$, $I^-$, $SO_4^-$, $CF_3SO_3^-$, $CF_3CO_2^-$, $(CF_5SO_2)(CF_3SO_2)N^-$, $NO_3^-$, $Al_2Cl_7^-$, $CH_3COO^-$, $[N(SO_2F)_2]^-$, $CH_3SO_3^-$, $CF_3SO_3^-$, and a combination thereof.

In another embodiment, the ionic liquid may be selected from the group consisting of N-methyl-N-butyl pyrrolidinium bis(trifluoromethylsulfonyl)imide, N-methyl-N-propylpyrrolidinium bis(trifluoromethanesulfonyl)imide, N-butyl-N-methylpyrrolidinium bis(3-trifluoromethylsulfonyl)imide, 1-butyl-3-methylimidazolium bis(trifluoromethylsulfbnyl)imide, 1-ethyl-3-methylimidazolium bis(trifluoromethylsulfonyl)imide, and a combination thereof. Such ionic liquid is advantageous in improving stability of the hybrid solid electrolyte.

The liquid electrolyte includes the lithium ions or the sodium ions which are dissolved in the solvent. When the hybrid solid electrolyte is made by infusing the liquid electrolyte into the hybrid film, the ion conductive ceramic's negative property such as high interfacial resistance can be alleviated. At the same time, polymer's disadvantageous property such as low ion conductivity at room temperature can also be subdued. Once being absorbed into the hybrid film, the liquid electrolyte is commingled with the polymer. Under this condition, the liquid electrolyte's negative property such as inflammability and leakage tendency can be effectively suppressed. As a result, the resulting hybrid solid electrolyte ends up high thermal stability and low interfacial resistance.

The liquid electrolyte may be a solution obtained by dissolving 0.1 M-3M of lithium salt or 0.1 M-3M of sodium salt in a solvent. Preferably, the liquid electrolyte may be a solution obtained by dissolving 0.1 M to 2 M of the lithium salt or 0.1 M to 2 M of sodium salt in the solvent.

The mixture ratio of the hybrid film and the liquid electrolyte may be 60 to 100 parts by weight and 1 to 40 parts by weight, respectively. When the amount of the liquid electrolyte used is less than 1 parts by weight, the interfacial resistance is too high. In contrast, when the amount of the liquid electrolyte used is more than 40 parts by weight, the above-mentioned problems which are found in a conventional liquid electrolyte battery, such as high inflammability and low thermal stability, persists.

Preferably, the mixture ratio of the hybrid film and the liquid electrolyte may be 70 to 80 parts by weight and 10 to 20 parts by weight, respectively. At such mixture ratio, an optimum effect can be obtained of improving ion conductivity of the hybrid film and enhancing thermal stability of the liquid electrolyte at the same time.

The hybrid solid electrolyte may be formed to a thickness of 10-150 μm, and preferably, 10-30 μm. It is confirmed from examination that a hybrid solid electrolyte as thin as 10-30 μm in thickness can have significantly high stability, especially high in thermally stability. It suggests that a hybrid solid electrolyte for use in a commercial secondary battery can be formed as thin as 10-30 μm in thickness. Specifically, the hybrid solid electrolyte may have excellent thermal stability at a temperature of 400° C. or more.

In addition, the hybrid solid electrolyte has excellent electrochemical stability. In an embodiment, the hybrid solid electrolyte has an electrochemical stability of 6 V or more.

Furthermore, the hybrid solid electrolyte shows remarkably low interfacial resistance. In an embodiment, the hybrid solid electrolyte may have an interfacial resistance of 800Ω or less.

In the hybrid solid electrolyte of the present invention, the ion (Li or Na) conductive ceramic can contribute to improve ion conductivity and a transport rate of ion (Li or Na). The polymer effectively binds ceramic particles to each other. The liquid electrolyte improves ion conductivity, reduces interfacial resistance between ceramic particles, and also reduces interfacial resistance between the electrode and the electrolyte. Thus, the hybrid solid electrolyte, which is manufactured by a combination of the ceramic and the polymer, has excellent thermal and electrochemical stability. Even a small amount of liquid electrolyte can contribute to improve electrochemical characteristics of a secondary battery by reducing interfacial resistance.

A secondary battery according to an embodiment of the present invention may include a cathode, an anode, and the above-described hybrid solid electrolyte interposed between the cathode and the anode.

Any cathode, which is known as applicable to a lithium secondary battery or a sodium secondary battery, can serve as the cathode of the secondary battery according to an embodiment of the present invention. Likewise, any anode, which is known as applicable to a lithium secondary battery or a sodium secondary battery, can serve as the anode of the secondary battery according to an embodiment of the present invention.

Thus, a detailed explanation will be omitted here on the cathode and the anode. The hybrid solid electrolyte is explained above. So, the description thereof will not be repeated here to avoid redundancy.

According to an embodiment of the present invention, a lithium secondary battery may employ LiFePO$_4$ as a cathode, Li metal an anode, and the above-mentioned hybrid solid electrolyte as an electrolyte. Upon such combination, thermal and electrochemical stability improve and interfacial resistance reduces. Thereby, resulting lithium secondary battery can have a high capacity of 150 mAh/g or more.

In another embodiment, a sodium secondary battery may employ NaFePO$_4$ as a cathode, Na metal as an anode, and the above-mentioned hybrid solid electrolyte as an electrolyte. Upon such combination, thermal and electrochemical stability improve and interfacial resistance reduces. Thereby, resulting lithium secondary battery can have a discharge capacity of 135 mAh/g or more.

A method for producing a hybrid solid electrolyte according to an embodiment of the present invention includes: mixing 60 to 100 parts by weight of an ion conductive ceramic and 1 to 40 parts by weight of a polymer to prepare a mixture slurry; making the mixture slurry into a film shape to obtain a hybrid film; and interfusing a liquid electrolyte into the hybrid film to form a hybrid solid electrolyte.

The explanation on the ion conductive ceramic, the polymer, a mixing ratio thereof, the hybrid film, the liquid electrolyte, the solvent thereof are already provided above. To avoid redundancy, the description thereof will not be repeated here.

The hybrid film may be prepared by a printing method or a doctor blading method, i.e., a method of coating the mixture slurry onto a given medium and then drying the mixture slurry. However, the present invention is not limited thereto. Any method is applicable without particular limitation as long as the slurry is reduced into a film shape.

The liquid electrolyte, in the infusing step, may employ an ionic liquid as a solvent. Detailed explanation on examples and preferable amounts of the ionic liquid is already provided above. To avoid redundancy, the explanation thereon will not be repeated here.

In the interfusing step, 60 to 100 parts by weight of the hybrid film is impregnated with 1 to 40 parts by weight of the liquid electrolyte. To avoid redundancy, a detailed explanation on the mixture ratio and advantages thereof will not be repeated here.

Advantages of the Invention

By employing a hybrid solid electrolyte of the present invention and a production method thereof, a secondary battery can have improved stability and electrochemical characteristics. The present invention can also provide a method of manufacturing a hybrid solid electrolyte for use in a secondary battery in a simplified manner. By employing a hybrid solid electrolyte according to the present invention, a lithium secondary battery or a sodium secondary battery can be obtained which has an excellent discharge capacity, low interfacial resistance, and high stability. That is, the secondary battery has improved characteristics both in stability and in electrochemical characteristics.

BEST MODE

Hereinafter, embodiments according to the present invention will be described in detail with reference to accompanying drawings to help understanding of the present invention. However, the embodiment described herein does not limit the scope of the present invention.

A hybrid solid electrolyte was produced by the following method, e.g., by mixing a conductive ceramic, a polymer, and a liquid electrolyte. Physical properties thereof were evaluated. As described below, the hybrid solid electrolyte has excellent stability, good variability, and excellent electrochemical characteristics.

Production and Characteristic Evaluation of Hybrid Solid Electrolyte and Battery A first solvent is prepared by mixing N-methyl-2-pyrrolidone (NMP) and acetone at a volume ratio of 1:3. 70 parts by weight of conductive ceramic and 15 parts by weight of polymer are poured into the first solvent to obtain a slurry. The slurry is shaped into a film using a printing method or a doctor blading method. Using this method, the slurry was flatly applied onto a given medium and underwent a phase separation. As a result, a hybrid film is obtained. Then, a liquid electrolyte is prepared.

Figure 1:
FIG. 1 is a schematic view of a hybrid solid electrolyte according to an embodiment of the present invention.

The hybrid film obtained as such is impregnated with the liquid electrolyte, resulting in a hybrid solid electrolyte shown in FIG. 1. 15 parts by weight of liquid electrolyte (or an ionic liquid electrolyte) is interfused into 85 parts by weight of the hybrid film.

A second battery is manufactured using the hybrid film obtained as such. Interfacial resistance, charge-discharge tests, and the like were examined to evaluate electrochemical characteristics of the second battery obtained as such.

Example 1

(1) Production of Lithium Ion Conductive Hybrid Solid Electrolyte 70 parts by weight of Li$_{1.3}$Al$_{0.3}$Ti$_{1.7}$(PO$_4$)$_3$(LTAP) was selected as a lithium conductive ceramic. 15 parts by weight of Polyvinylidene fluoride (PVdF) was selected as a polymer.

As mentioned above, the first solvent is prepared by mixing N-methyl-2-pyrrolidone (NMP) and acetone at a volume ratio of 1:3. 70 parts by weight of Li$_{1.3}$Al$_{0.3}$Ti$_{1.7}$(PO$_4$)$_3$(LTAP) and 15 parts by weight of Polyvinylidene fluoride (PVdF) were poured into the first solvent. Thereby, a slurry is obtained. The slurry is shaped into a hybrid film.

A second solvent is prepared by mixing ethylene carbonate (EC) and dimethyl carbonate (DMC) at a volume ratio of 1:1.

1 M LiPF$_6$ is added to the second solvent to obtain a liquid electrolyte. The liquid electrolyte obtained as such is examined as Comparative. That is, the liquid electrolyte, which is not combined with the hybrid film, is employed as the Comparative Example. Examination result on the Comparative Example is shown in FIG. 3.

15 parts by weight of the liquid electrolyte is applied to 85 parts by weight of the hybrid film to obtain a lithium ion conductive hybrid solid electrolyte.

Figure 2A:
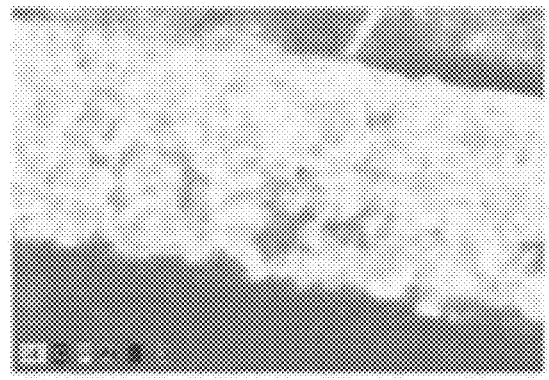
FIG. 2a is a Scanning Electron Microscope-Energy-Dispersive X-ray (SEM-EDX) analysis data showing a cross-section of the lithium ion conductive electrolyte which is obtained in Example 1 of the present invention.
Figure 3:
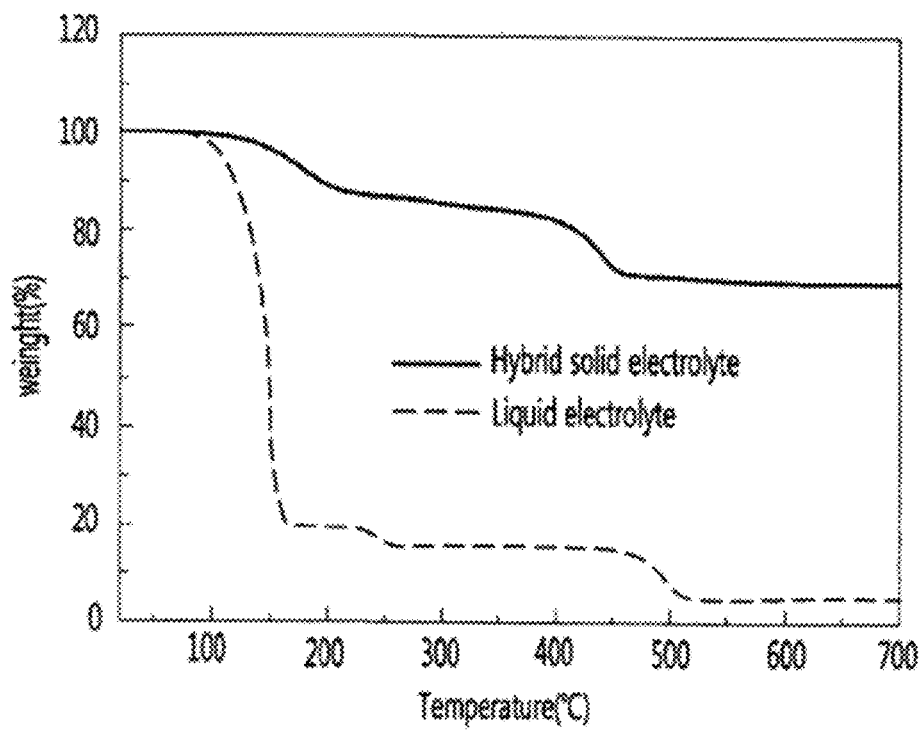
FIG. 3 is a thermogravimetric (TG) graph showing thermal stability of the lithium ion conductive hybrid solid electrolyte, which is produced in Example 1 of the present invention.
Figure 4:
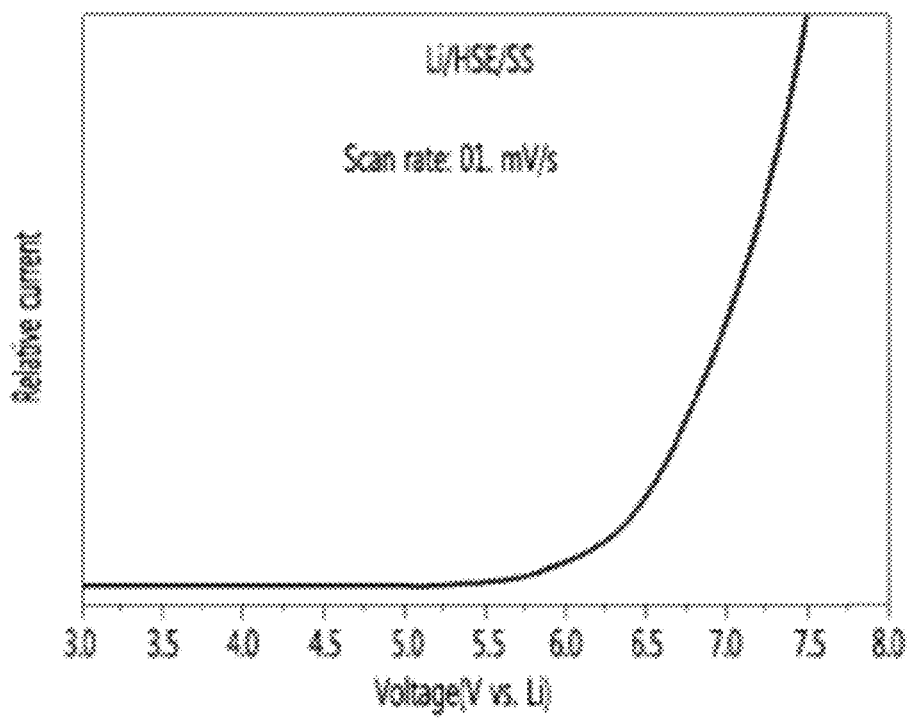
FIG. 4 is a linear sweep voltammetry (LVS) showing electrochemical stability of the lithium ion conductive hybrid solid electrolyte, which is produced in Example 1 of the present invention.

The lithium ion conductive hybrid solid electrolyte obtained and its examination result is provided as Example 1 in FIG. 2a and FIGS. 3-4.

(2) Evaluation of Physical Properties of Lithium Ion Conductive Hybrid Solid Electrolyte FIG. 2a is a SEM-EDX analysis data showing a cross-section of the lithium ion conductive electrolyte which is obtained in Example 1 of the present invention.

Referring to FIG. 2a, the hybrid solid electrolyte, which is obtained in Example 1, is formed into a thickness of 30 rpm. It confirmed from EDX, LTAPO and the polymer were uniformly mixed.

Thermal stability of Comparative Example and Example 1 is examined and shown in FIG. 3. Electrochemical stability of Example 1 is examined and shown in FIG. 4.

Specifically, a TG graph evaluating thermal stability of the lithium ion conductive hybrid solid electrolyte and a linear sweep voltammetry (LSV) evaluating electrochemical stability of the lithium ion conductive hybrid solid electrolyte are illustrated in FIGS. 3 and 4, respectively.

Referring to FIG. 3, the liquid electrolyte, which is not combined with the hybrid film and serves as the Comparative Example, was decomposed at 120° C. In contrast, the hybrid solid electrolyte of the present invention showed high thermal stability even at 400° C. or more.

For the hybrid solid electrolyte, a slight decrease in weight is observed at 180° C. This is due to the presence of the liquid electrolyte absorbed in the hybrid solid electrolyte.

From the graph of linear sweep voltammetry shown in FIG. 4, it is also confirmed that the hybrid solid electrolyte has excellent stability of 6 V or more.

(3) Manufacture and Physical Property Evaluation of Battery Using Lithium Ion Conductive Hybrid Solid Electrolyte A secondary battery was manufactured using (i) LiF$_3$PO$_4$ as a cathode, (ii) using Li metal, which has the lowest potential, as an anode, and (iii) using the lithium ion conductive hybrid solid electrolyte, which is produced above, as an electrolyte. Physical properties thereof were evaluated. The lithium ion conductive hybrid solid electrolyte employs (Li$_{1.3}$Al$_{0.3}$Ti$_{1.7}$ (PO$_4$)$_3$) as the lithium ion conductive ceramic.

Figure 5:
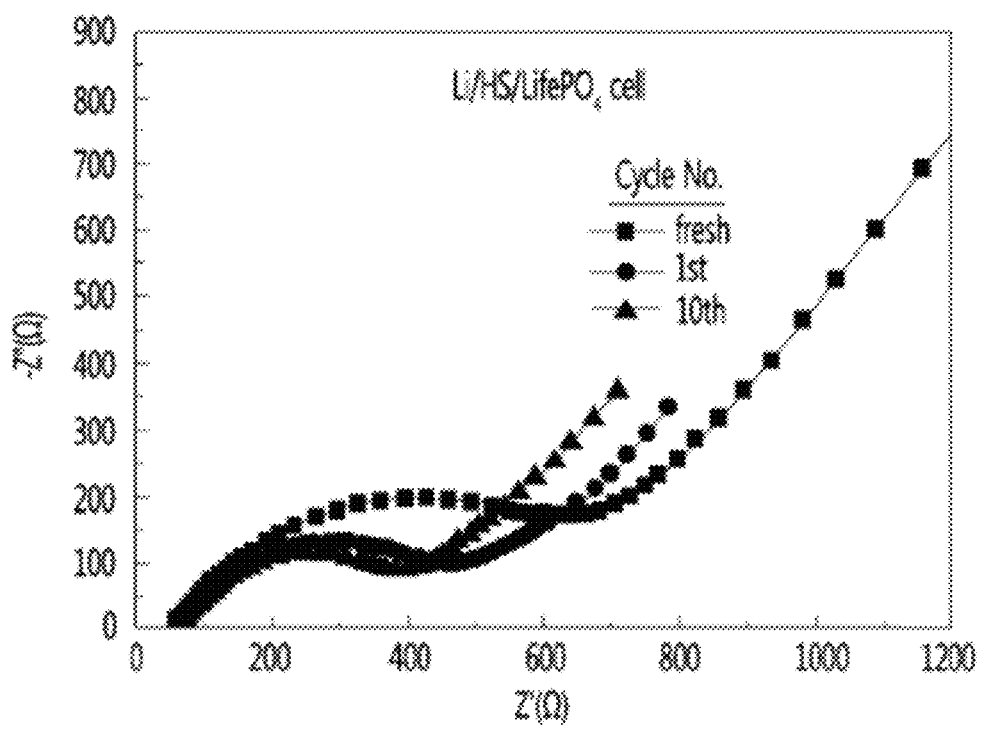
FIG. 5 is a graph showing interfacial resistance characteristics of a battery, which employs the lithium ion conductive hybrid solid electrolyte produced in Example 1 of the present invention.

The interfacial resistance of the secondary battery manufactured as such was measured. As illustrated in FIG. 5, the secondary battery showed low resistance of 800Ω or less.

Figure 6:
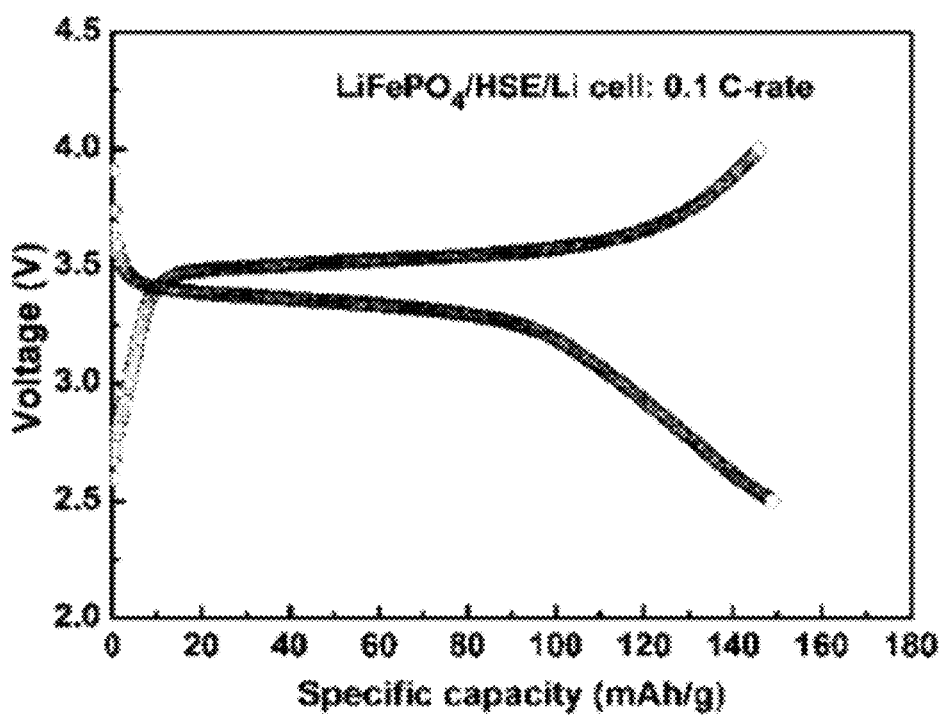
FIG. 6 is a charge-discharge curve of a secondary battery, which employs the lithium ion conductive hybrid solid electrolyte produced in Example 1 of the present invention and LiFePO$_4$ electrodes.

Charge-discharge characteristics of the secondary battery were examined by charging-discharging the battery at room temperature and at a current density of 0.1 C. Referring to FIG. 6, discharge capacity of the secondary battery at 2.5 V was 150 mAh/g, which is pretty high.

Example 2

(1) Production and Physical Property Evaluation of Sodium Ion Conductive Hybrid Solid Electrolyte 70 parts by weight of $Na_3Zr_2Si_2PO_{12}$ was selected as a sodium conductive ceramic 15 parts by weight of PVdF was selected as a polymer.

The first solvent is prepared by mixing N-methyl-2-pyrrolidone (NMP) and acetone at a volume ratio of 1:3. 70 parts by weight of $Na_3Zr_2Si_2PO_{12}$ and 15 parts by weight of Polyvinylidene fluoride (PVdF) were poured into the first solvent. Thereby, a slurry is obtained. The slurry is shaped into a hybrid film.

Tetraethylene glycol dimethyl ether (TEGDME) solvent is prepared as a second solvent.

1M $NaCF_3SO_3$ (sodium triflate) is added to the second solvent to obtain a liquid electrolyte. 15 parts by weight of the liquid electrolyte is applied to 85 parts by weight of the hybrid film to obtain a sodium ion conductive hybrid solid electrolyte.

Figure 2B:
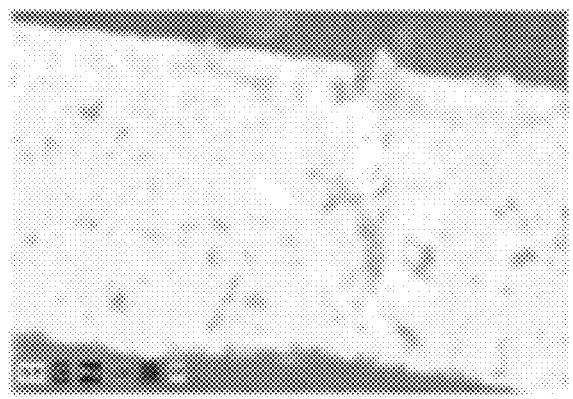
FIG. 2b is a SEM-EDX analysis data showing a cross-section of the sodium ion conductive electrolyte which is obtained in Example 2 of the present invention.

The sodium ion conductive hybrid solid electrolyte was examined using EDX. Results are shown in FIG. 2b. Referring to FIG. 2b, the hybrid solid electrolyte was formed into a thickness of 30 μm. From FIG. 2b, it is confirmed that the ceramic and the polymer were uniformly mixed with each other.

(2) Manufacture and Physical Property Evaluation of Battery Using Sodium Ion Conductive Hybrid Solid Electrolyte A secondary battery was manufactured by using (i) $NaFePO_4$ as a cathode, (ii) using Na metal as an anode, and (iii) using the sodium ion conductive hybrid solid electrolyte produced above as an electrolyte. Physical properties thereof were evaluated.

As mentioned above, the sodium ion conductive hybrid solid electrolyte employs sodium conductive ceramic ($Na_3Zr_2Si_2PO_{12}$) as the ionic conductive ceramic.

Figure 7:
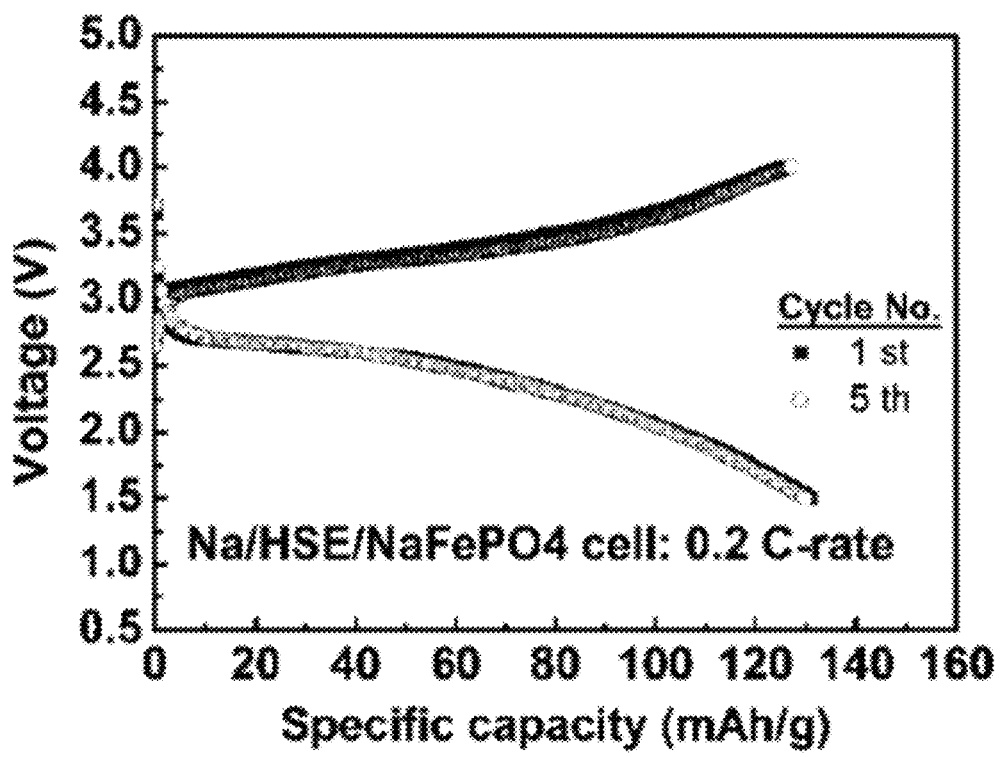
FIG. 7 is a charge-discharge curve of a sodium battery, which employs (i) a sodium ion conductive hybrid solid electrolyte produced in Example 2 of the present invention and (ii) NaFePO$_4$ as an electrode.

Charge-discharge characteristics of the secondary battery obtained as such was examined by charging-discharging the battery at room temperature and at a current density of 0.1 C. Result is illustrated in FIG. 7. Referring to FIG. 7, the secondary battery shows discharge capacity of 135 mAh/g at 1.5 V, which is excellent.

Example 3

(1) Production of Lithium Ion Conductive Hybrid Solid Electrolyte Using Ionic Liquid Electrolyte 70 parts by weight of $Li_{1.3}Al_{0.3}Ti_{1.7}(PO_4)_3$ (LTAP) was selected as a lithium conductive ceramic. 15 parts by weight of PVdF was selected as a polymer.

The first solvent is prepared by mixing N-methyl-2-pyrrolidone (NMP) and acetone at a volume ratio of 1:3.

70 parts by weight of $Li_{1.3}Al_{0.3}Ti_{1.7}(PO_4)_3$ (LTAP) and 15 parts by weight of Polyvinylidene fluoride (PVdF) were poured into the first solvent. Thereby, a slurry is obtained. The slurry is shaped into a hybrid film.

An ionic liquid electrolyte is produced by dissolving 1 M lithium bis(fluorosulfonyl)imide (LiFSI) in an ionic liquid, N-methyl-N-butylpyrrolidinium bis(trifluoromethylsulfonyl)imide ($Py_{14}TFSI$).

A lithium ion conductive hybrid solid electrolyte was formed by applying 15 parts by weight of the ionic liquid electrolyte is applied to 85 parts by weight of the hybrid film to obtain a lithium ion conductive hybrid solid electrolyte.

Figure 8:
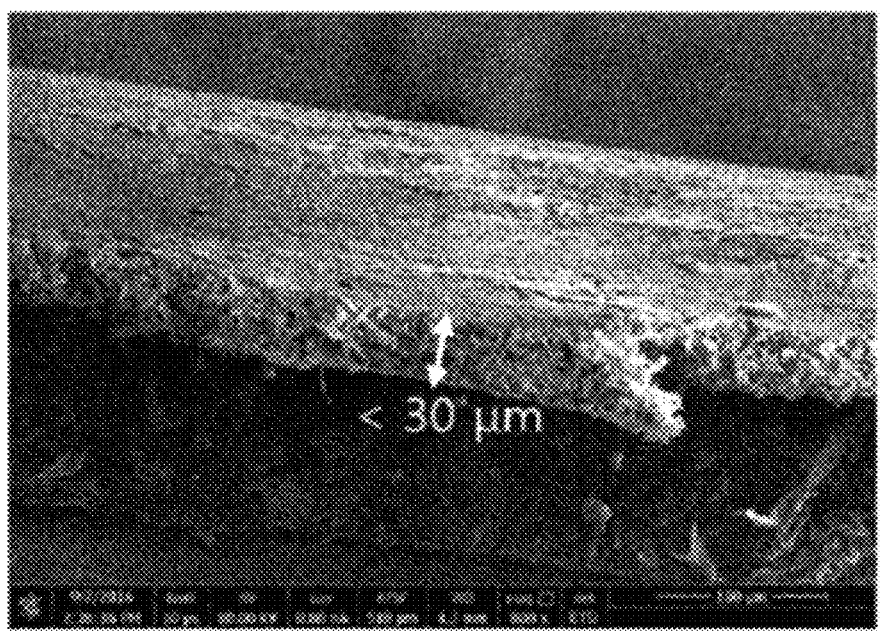
FIG. 8 is an SEM photograph showing a cross section of the lithium ion conductive hybrid solid electrolyte produced in Example 3 of the present invention.

FIG. 8 is an SEM photograph of a shearing surface of the lithium ion conductive hybrid solid electrolyte produced to a thickness of 30 μm in Example 3 of the present invention. From FIG. 8, it is confirmed that the polymer and the conductive ceramic were mixed well with each other.

Figure 9:
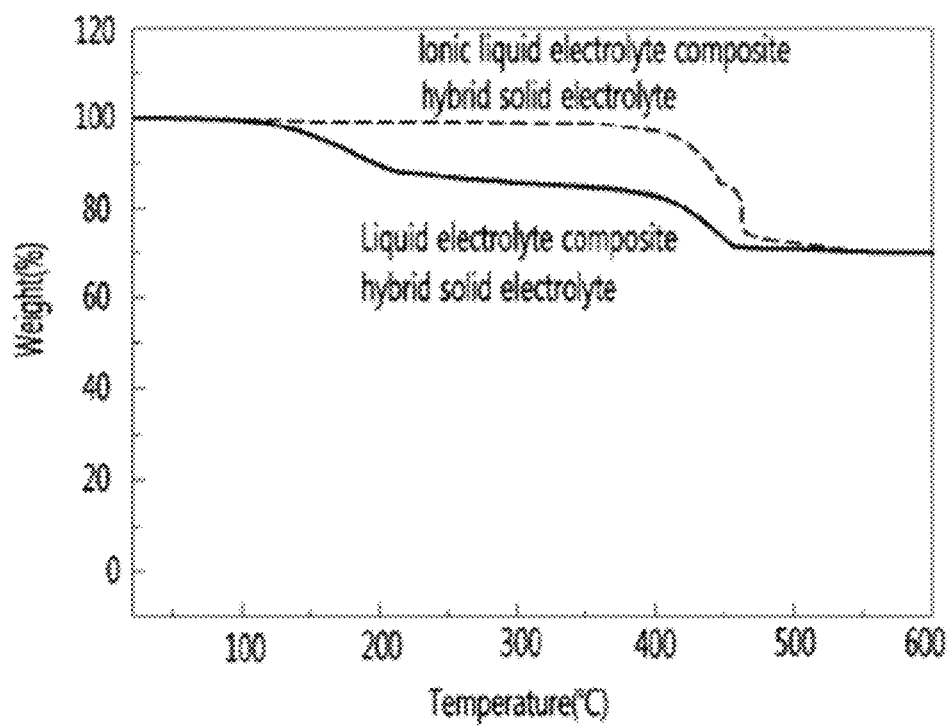
FIG. 9 is a TG graph showing (i) thermal stability of a lithium ion conductive hybrid solid electrolyte (dotted line) produced in Example 3 of the present invention and (ii) thermal stability of a lithium ion conductive hybrid solid electrolyte (solid line) produced in Example 1 of the present invention.

FIG. 9 is a TG graph showing thermal stability of the hybrid solid electrolyte obtained in Example 3. Referring to FIG. 9, it could be confirmed that the hybrid solid electrolyte had thermal stability at 400° C. or higher. This is further improved value compared with the hybrid solid electrolyte obtained in Example 1.

The scope of the present invention is not limited to the above-mentioned Examples. It should be understood that many variations and modifications, which a person having an ordinary skill in the art can make based on above disclosure, also fall within the right scope of the present invention.

What is claimed is:

1. A hybrid solid electrolyte comprising:
   a hybrid film including (i) 60 to 100 parts by weight of an ion conductive ceramic and (ii) 1 to 40 parts by weight of a polymer; and
   a liquid electrolyte including (i) an ion compound selected from the group consisting of lithium ions and sodium ions and (ii) a non-aqueous organic solvent,
   wherein the hybrid solid electrolyte includes (i) 60 to 100 parts by weight of the hybrid film and (ii) 1 to 40 parts by weight of the liquid electrolyte,
   wherein the liquid electrolyte is impregnated in the hybrid film in a manner in which the liquid electrolyte physically contacts the ion conductive ceramic and the polymer.

2. The hybrid solid electrolyte of claim 1, wherein the hybrid solid electrolyte has a thickness of 30 μm or less.

3. The hybrid solid electrolyte of claim 1, wherein the hybrid solid electrolyte has a thermal stability at 400° C. or more.

4. A secondary battery comprising the hybrid solid electrolyte according to claim 1.

* * * * *